United States Patent
Lee et al.

(10) Patent No.: US 10,966,229 B2
(45) Date of Patent: Mar. 30, 2021

(54) METHOD FOR HANDLING FOR BANDWIDTH PART OPERATION IN WIRELESS COMMUNICATION SYSTEM AND A DEVICE THEREFOR

(71) Applicant: LG ELECTRONICS INC., Seoul (KR)

(72) Inventors: Eunjong Lee, Seoul (KR); Gyeongcheol Lee, Seoul (KR); Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/178,475

(22) Filed: Nov. 1, 2018

(65) Prior Publication Data

US 2019/0132855 A1 May 2, 2019

Related U.S. Application Data

(60) Provisional application No. 62/580,443, filed on Nov. 1, 2017.

(51) Int. Cl.
*H04W 72/12* (2009.01)
*H04W 72/04* (2009.01)

(52) U.S. Cl.
CPC ... *H04W 72/1268* (2013.01); *H04W 72/0453* (2013.01); *H04W 72/1273* (2013.01)

(58) Field of Classification Search
CPC ......... H04W 72/1268; H04W 72/1273; H04W 72/0406; H04W 72/044
See application file for complete search history.

(56) References Cited

U.S. PATENT DOCUMENTS

2013/0343238 A1* 12/2013 Seo .................. H04L 5/001
370/280
2016/0295561 A1* 10/2016 Papasakellariou .. H04W 72/042
(Continued)

FOREIGN PATENT DOCUMENTS

| KR | 20090126211 | 12/2009 |
| KR | 20170071509 | 6/2017 |
| WO | 2019/062899 | 4/2019 |

OTHER PUBLICATIONS

3GPP TSG-RAN WG1 Meeting #90bis, R1-1717077, Oct. 2, 2017 See section 3.4, section 3.1. (Year: 2017).*
(Continued)

*Primary Examiner* — Redentor Pasia
(74) *Attorney, Agent, or Firm* — Lee Hong Degerman Kang & Waimey

(57) ABSTRACT

The present invention relates to a wireless communication system. More specifically, the present invention relates to a method and a device for handling for Bandwidth Part operation in wireless communication system, the method comprising: starting a timer related to a downlink (DL) bandwidth part (BWP), when an active BWP for a serving cell is switched to the DL BWP; wherein DL semi-persistent scheduling (SPS) resources are configured on the DL BWP and uplink (UL) SPS resources are configured on a UL BWP related with the DL BWP; transmitting UL data on one of the UL SPS resources or receiving DL data on one of the DL SPS resources; and restarting the timer related to the DL BWP when the UL data is transmitted on the UL SPS resource or the DL data is received in the DL SPS resource.

16 Claims, 13 Drawing Sheets

(56) References Cited

U.S. PATENT DOCUMENTS

| | | | |
|---|---|---|---|
| 2017/0201308 A1* | 7/2017 | Park | H04B 17/24 |
| 2018/0160445 A1* | 6/2018 | Babaei | H04W 72/14 |
| 2018/0183551 A1* | 6/2018 | Chou | H04L 5/0042 |
| 2019/0044689 A1* | 2/2019 | Yiu | H04L 5/0098 |
| 2019/0044811 A1* | 2/2019 | Miao | H04L 41/0896 |
| 2019/0053029 A1* | 2/2019 | Agiwal | H04W 76/28 |
| 2019/0132862 A1* | 5/2019 | Jeon | H04W 72/14 |
| 2019/0199503 A1* | 6/2019 | Son | H04L 5/0053 |

OTHER PUBLICATIONS

3GPP TSG-RAN WG2 Meeting #99bis, R2-1710662, Sep. 29, 2017 See section 1, section 3. (Year: 2017).*
PCT International Application No. PCT/KR2018/012468, Notification of Transmittal of the International Search Report and the Written Opinion of the International Searching Authority, or Declaration dated Feb. 13, 2019, 12 pages.
Huawei, et al., "Remaining issues on bandwidth part", 3GPP TSG RAN WG1 Meeting #90bis, R1-1717077, Oct. 2017, 11 pages.
Samsung, "Impact of Bandwidth Parts on SPS Scheduling", 3GPP TSG RAN WG2 Meeting #99bis, R2-1711289, Oct. 2017, 4 pages.
Samsung, "On Bandwidth Part Operation", 3GPP TSG RAN WG1 NR Meeting #90bis, R1-1717675, Oct. 2017, 8 pages.
Interdigital, "Timer-based change to default bandwidth part", 3GPP TSG RAN WG2 Meeting #99bis, R2-1710663, Oct. 2017, 5 pages.
Oppo, "Timer based BWP switching", 3GPP TSG RAN WG2 Meeting #99bis, R2-1710126, Oct. 2017, 3 pages.
Oppo, "SPS operations for BWP switching," 3GPP TSG RAN WG2 #99-Bis, R2-1710134, Prague, Czech Republic, Oct. 9-13, 2017, 3 pages.
Korean Intellectual Property Office Application No. 10-2018-0126546, Notice of Allowance dated Nov. 12, 2019, 2 pages.
Huawei et al., "Bandwidth part activation and adaptation," 3GPP TSG RAN WG1 Meeting #90bis, R1-1717905, Prague, Czech Republic, Oct. 9-13, 2017, 7 pages.
Ericsson, "Remaining issues for Scheduling Request," 3GPP TSG-RAN WG2 #99bis, R1-1711178, Prague, Czech Republic, Oct. 9-13, 2017, 9 pages.
European patent application No. 18826167.1, European search report dated Jun. 23, 2020, 13 pages.
Vivo, "HARQ process ID and timer for SPS," 3GPP TSG-RAN WG2 Meeting #99bis, R2-1710959, Prague, Czech Republic, Oct. 9-13, 2017, 4 pages.
LG Electronics Inc., "Restart condition of sCellDeactivation Timer with skipping operation," 3GPP TSG-RAN WG2 #99Bis, R2-1711570, Prague, Czech Republic, Oct. 9-13, 2017, 3 pages.

* cited by examiner (a) Control-Plane Protocol Stack (b) User-Plane Protocol Stack (a) Control-Plane Protocol Stack (b) User-Plane Protocol Stack

METHOD FOR HANDLING FOR BANDWIDTH PART OPERATION IN WIRELESS COMMUNICATION SYSTEM AND A DEVICE THEREFOR

Pursuant to 35 U.S.C. § 119(e), this application claims the benefit of U.S. Provisional Patent Application No. 62/580,443, filed on Nov. 1, 2017, the contents of which are hereby incorporated by reference herein in its entirety.

BACKGROUND OF THE INVENTION

Field of the Invention

The present invention relates to a wireless communication system and, more particularly, to a method for handling for Bandwidth Part (BWP) operation in wireless communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described in the context of a long term evolution (LTE) system and a LTE-advanced (LTE-A) system in the present specification, they are purely exemplary. Therefore, the embodiments of the present invention are applicable to any other communication system corresponding to the above definition. An exemplary system in which the invention disclosed herein may be implemented is a system compliant with the 3GPP specification TS 36.321 Version 12.6.0. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
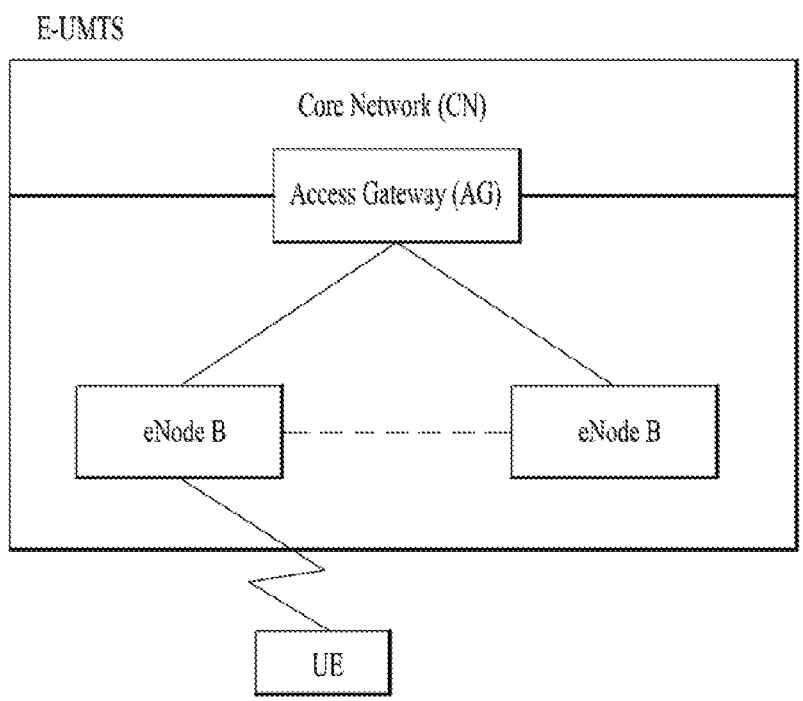
FIG. 1 is a diagram showing a network structure of an Evolved Universal Mobile Telecommunications System (E-UMTS) as an example of a wireless communication system.
Figure 2A:
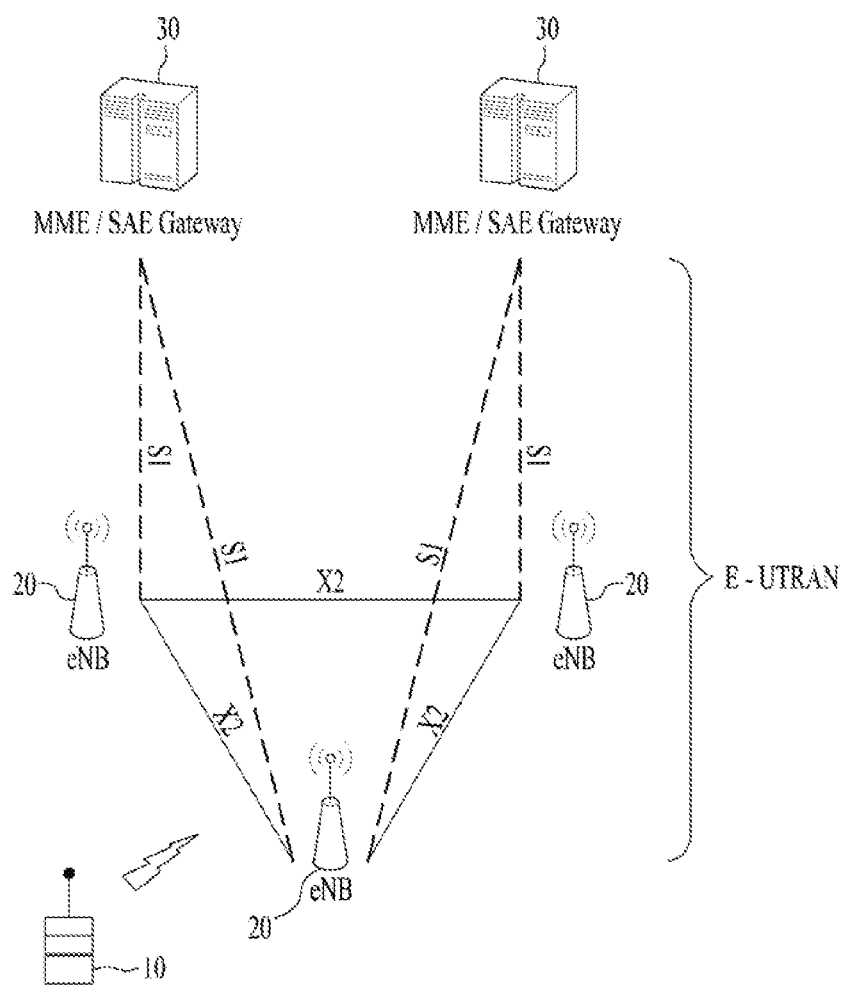
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
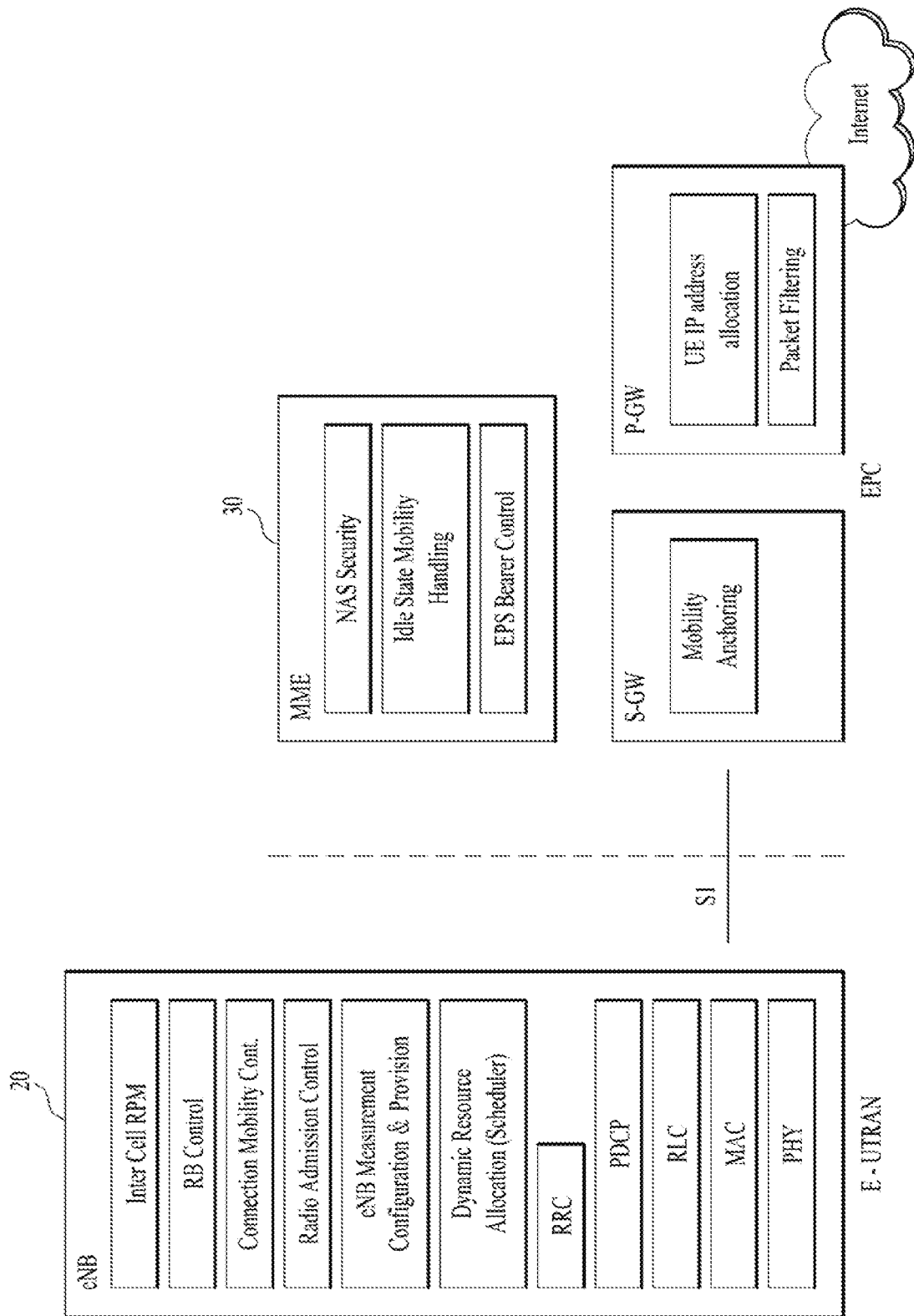
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
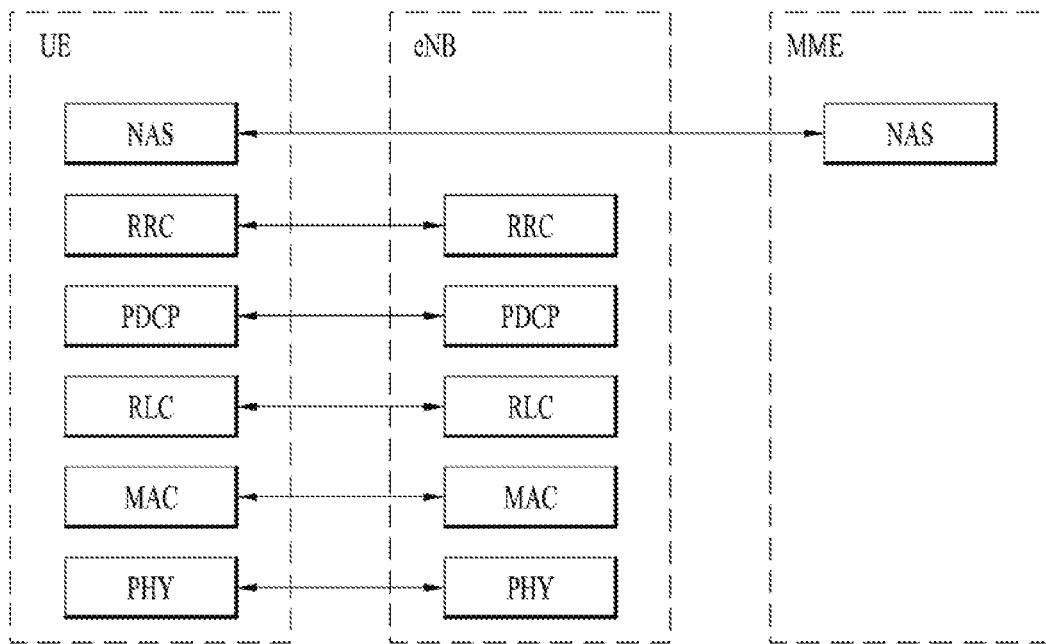
FIG. 3 is a diagram showing a control plane and a user plane of a radio interface protocol between a UE and an E-UTRAN based on a 3rd generation partnership project (3GPP) radio access network standard.
Figure 3:
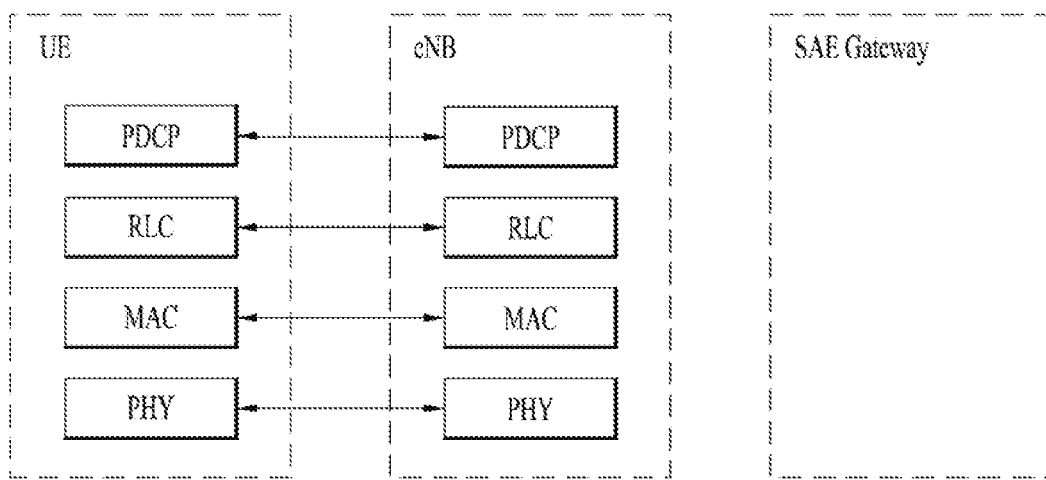

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
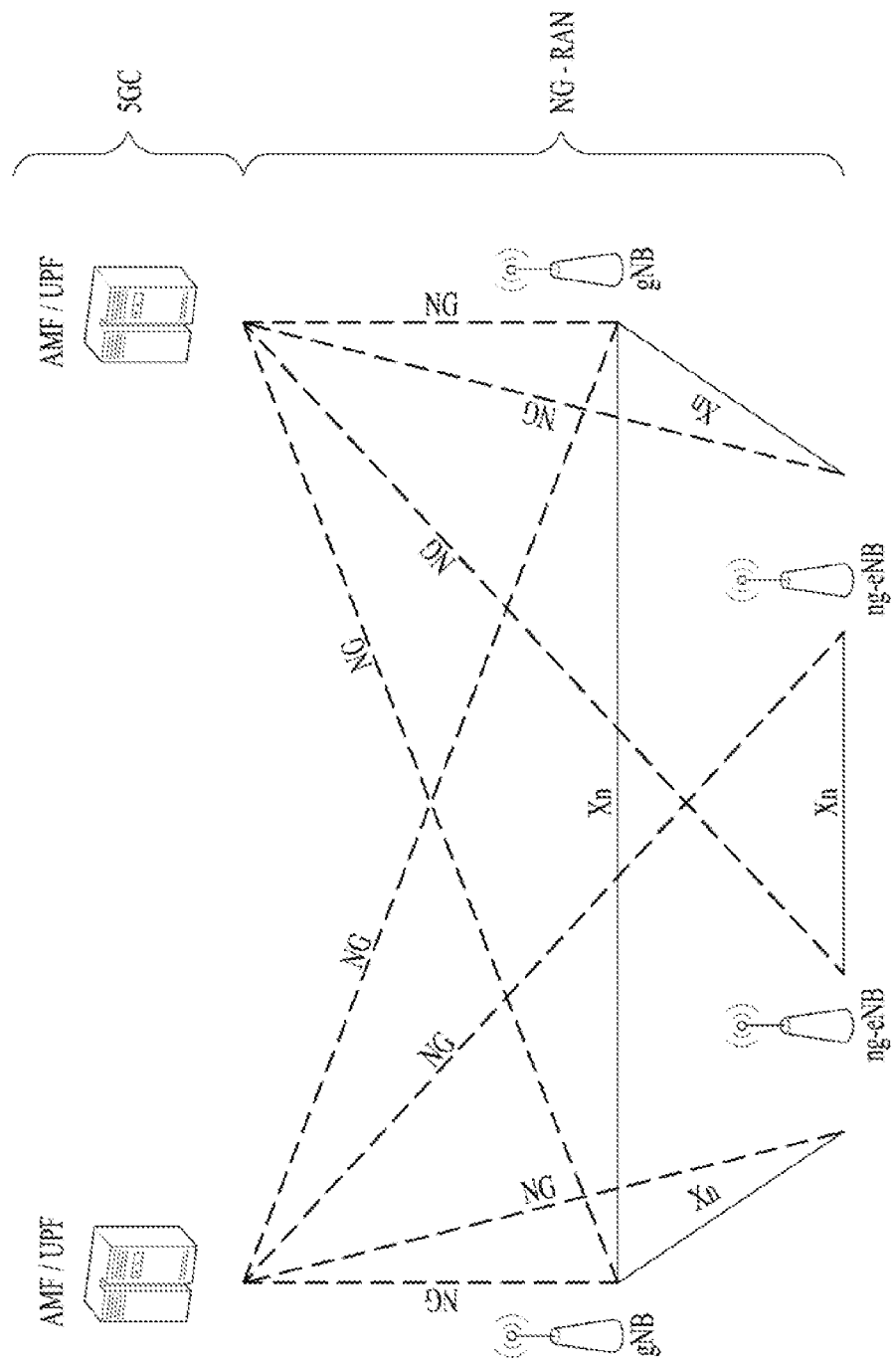
FIG. 4A is a block diagram illustrating network structure of NG Radio Access Network (NG-RAN) architecture.
Figure 4B:
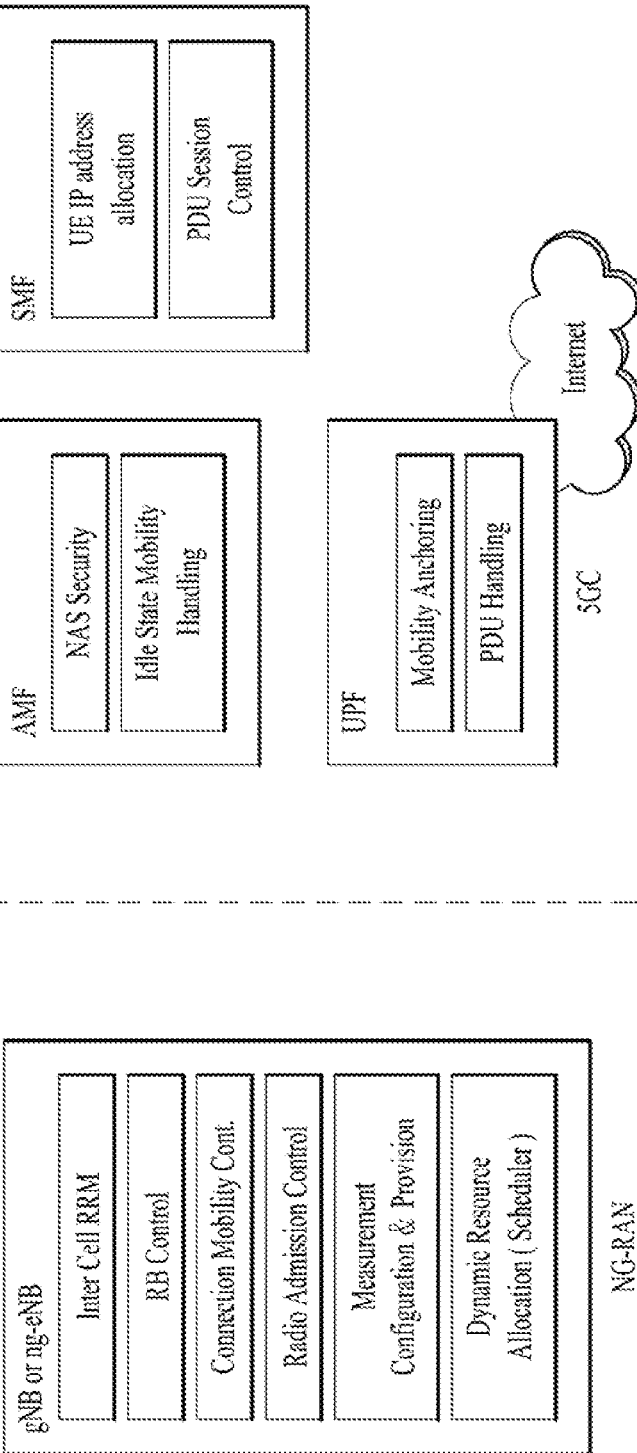
FIG. 4B is a block diagram depicting architecture of functional Split between NG-RAN and 5 G Core Network (5GC).

FIG. 4A is a block diagram illustrating network structure of NG Radio Access Network (NG-RAN) architecture, and FIG. 4B is a block diagram depicting architecture of functional Split between NG-RAN and 5 G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signaling protocol is referred to as XnAP (Xn Application Protocol). The SCTP layer provides the guaranteed delivery of application layer messages. In the transport IP layer point-to-point transmission is used to deliver the signaling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signaling messages, SCTP is added on top of IP. The application layer signaling protocol is referred to as NGAP (NG Application Protocol). The SCTP layer provides guaranteed delivery of application layer messages. In the transport, IP layer point-to-point transmission is used to deliver the signaling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v)

Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signaling termination, ii) NAS signaling security, iii) AS Security control, iv) Inter CN node signaling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
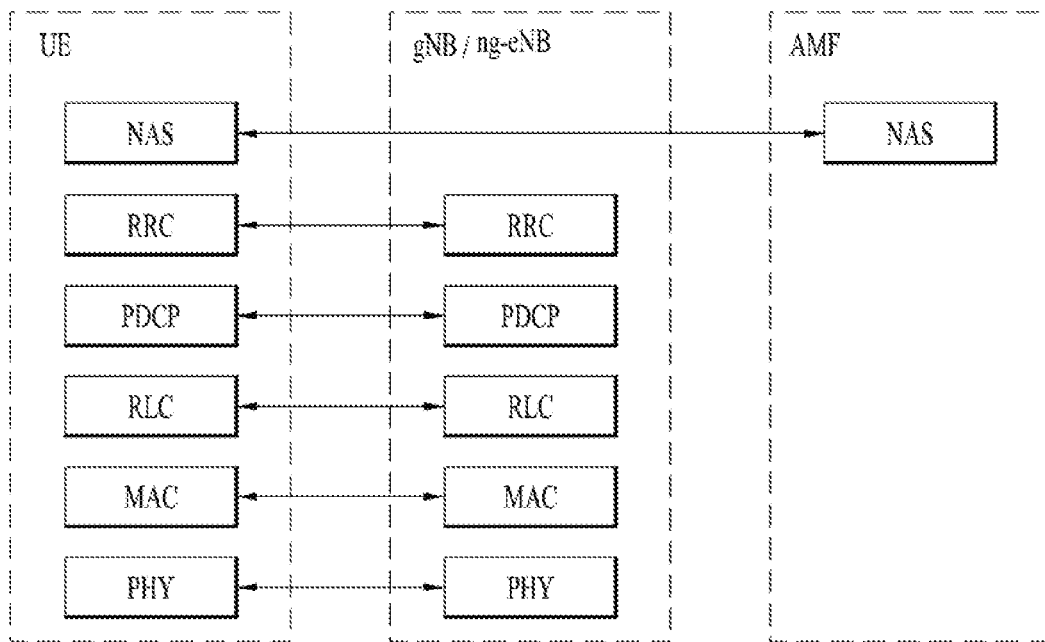
FIG. 5 is a diagram showing a control plane and a user plane of a radio interface protocol between a UE and a NG-RAN based on a 3rd generation partnership project (3GPP) radio access network standard.
Figure 5:
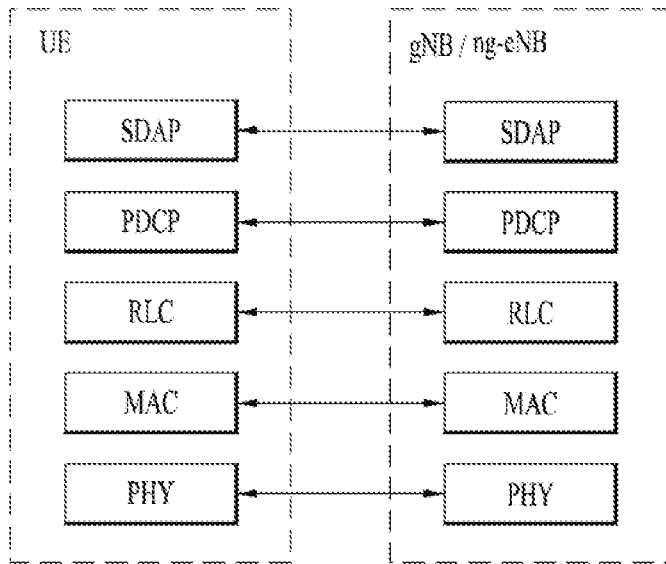

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
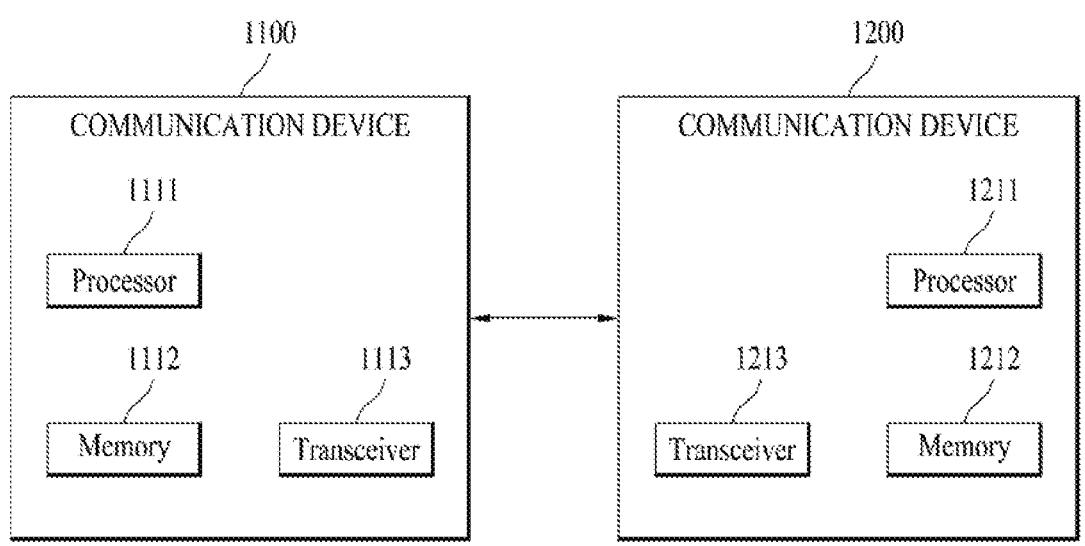
FIG. 6 is a block diagram of a communication apparatus according to an embodiment of the present invention.

FIG. 6 is a block diagram of communication devices according to an embodiment of the present invention.

The apparatus shown in FIG. 6 can be a user equipment (UE) and/or eNB or gNB adapted to perform the above mechanism, but it can be any device for performing the same operation.

As shown in FIG. 6, one of the communication device 1100 and the communication device 1200 may be a user equipment (UE) and the other one mat be a base station. Alternatively, one of the communication device 1100 and the communication device 1200 may be a UE and the other one may be another UE. Alternatively, one of the communication device 1100 and the communication device 1200 may be a network node and the other one may be another network node. In the present disclosure, the network node may be a base station (BS). In some scenarios, the network node may be a core network device (e.g. a network device with a mobility management function, a network device with a session management function, and etc.).

In some scenarios of the present disclosure, either one of the communication devices 1100, 1200, or each of the communication devices 1100, 1200 may be wireless communication device(s) configured to transmit/receive radio signals to/from an external device, or equipped with a wireless communication module to transmit/receive radio signals to/from an external device. The wireless communication module may be a transceiver. The wireless communication device is not limited to a UE or a BS, and the wireless communication device may be any suitable mobile computing device that is configured to implement one or more implementations of the present disclosure, such as a vehicular communication system or device, a wearable device, a laptop, a smartphone, and so on. A communication device which is mentioned as a UE or BS in the present disclosure may be replaced by any wireless communication device such as a vehicular communication system or device, a wearable device, a laptop, a smartphone, and so on.

In the present disclosure, communication devices 1100, 1200 include processors 1111, 1211 and memories 1112, 1212. The communication devices 1100 may further include transceivers 1113, 1213 or configured to be operatively connected to transceivers 1113, 1213.

The processor 1111 and/or 1211 implements functions, procedures, and/or methods disclosed in the present disclosure. One or more protocols may be implemented by the processor 1111 and/or 1211. For example, the processor 1111 and/or 1211 may implement one or more layers (e.g., functional layers). The processor 1111 and/or 1211 may generate protocol data units (PDUs) and/or service data units (SDUs) according to functions, procedures, and/or methods disclosed in the present disclosure. The processor 1111 and/or 1211 may generate messages or information according to functions, procedures, and/or methods disclosed in the present disclosure. The processor 1111 and/or 1211 may generate signals (e.g. baseband signals) containing PDUs, SDUs, messages or information according to functions, procedures, and/or methods disclosed in the present disclosure and provide the signals to the transceiver 1113 and/or 1213 connected thereto. The processor 1111 and/or 1211 may receive signals (e.g. baseband signals) from the transceiver 1113 and/or 1213 connected thereto and obtain PDUs, SDUs, messages or information according to functions, procedures, and/or methods disclosed in the present disclosure.

The memory of 1112 and/or 1212 is connected to the processor of the network node and stores various types of PDUs, SDUs, messages, information and/or instructions. The memory 1112 and/or 1212 may be arranged inside or outside the processor 1111 and/or 1211, respectively, and may be connected the processor 1111 and/or 1211, respectively, through various techniques, such as wired or wireless connections.

The transceiver 1113 and/or 1213 is connected to the processor 1111 and/or 1211, respectively, and may be controlled by the processor 1111 and/or 1211, respectively, to transmit and/or receive a signal to/from an external device. The processor 1111 and/or 1211 may control transceiver 1113 and/or 1213, respectively, to initiate communication and to transmit or receive signals including various types of information or data which are transmitted or received through a wired interface or wireless interface. The transceivers 1113, 1213 include a receiver to receive signals from an external device and transmit signals to an external device.

In a wireless communication device such as a UE or BS, an antenna facilitates the transmission and reception of radio signals (i.e. wireless signals). In the wireless communication device, the transceiver 1113 or 1213 transmits and/or receives a wireless signal such as a radio frequency (RF) signal. For a communication device which is a wireless communication device (e.g. BS or UE), the transceiver 1113 or 1213 may be referred to as a radio frequency (RF) unit. In some implementations, the transceiver 1113 and/or 1213 may forward and convert baseband signals provided by the processor 1111 and/or 1211 connected thereto into radio signals with a radio frequency. In the wireless communication device, the transceiver 1113 or 1213 may transmit or receive radio signals containing PDUs, SDUs, messages or information according to functions, procedures, and/or methods disclosed in the present disclosure via a radio interface (e.g. time/frequency resources). In some implementations, upon receiving radio signals with a radio frequency from another communication device, the transceiver 1113 and/or 1213 may forward and convert the radio signals to baseband signals for processing by the processor 1111 and/or 1211. The radio frequency may be referred to as a carrier frequency. In a UE, the processed signals may be processed according to various techniques, such as being transformed into audible or readable information to be output via a speaker of the UE.

In some scenarios of the present disclosure, functions, procedures, and/or methods disclosed in the present disclosure may be implemented by a processing chip. The processing chip may be a system on chip (SoC). The processing chip may include the processor 1111 or 1211 and the memory 1112 or 1212, and may be mounted on, installed on, or connected to the communication device 1100 or 1200. The processing chip may be configured to perform or control any one of the methods and/or processes described herein and/or to cause such methods and/or processes to be performed by a communication device which the processing chip is mounted on, installed on, or connected to. The memory 1112 or 1212 in the processing chip may be configured to store software codes including instructions that, when executed by the processor, causes the processor to perform some or all of functions, methods or processes discussed in the present disclosure. The memory 1112 or 1212 in the processing chip may store or buffer information or data generated by the processor of the processing chip or information recovered or obtained by the processor of the processing chip. One or more processes involving transmission or reception of the information or data may be performed by the processor 1111 or 1211 of the processing chip or under control of the processor 1111 or 1211 of the processing chip. For example, a transceiver 1113 or 1213 operably connected or coupled to the processing chip may transmit or receive signals containing the information or data under the control of the processor 1111 or 1211 of the processing chip.

For a communication device which is a wireless communication device (e.g. BS or UE), the communication device may include or be equipped with a single antenna or multiple antennas. The antenna may be configured to transmit and/or receive a wireless signal to/from another wireless communication device.

For a communication device which is a UE, the communication device may further include or be equipped with a power management module, an antenna, a battery, a display, a keypad, a Global Positioning System (GPS) chip, a sensor, a memory device, a Subscriber Identification Module (SIM) card (which may be optional), a speaker and/or a microphone. The UE may include or be equipped with a single antenna or multiple antennas. A user may enter various types of information (e.g., instructional information such as a telephone number), by various techniques, such as by pushing buttons of the keypad or by voice activation using the microphone. The processor of the UE receives and processes the user's information and performs the appropriate function (s), such as dialing the telephone number. In some scenarios, data (e.g., operational data) may be retrieved from the SIM card or the memory device to perform the function(s). In some scenarios, the processor of the UE may receive and process GPS information from a GPS chip to perform functions related to a position or a location of a UE, such as vehicle navigation, a map service, and so on. In some scenarios, the processor may display these various types of information and data on the display for the user's reference and convenience. In some implementations, a sensor may be coupled to the processor of the UE. The sensor may include one or more sensing devices configured to detect various types of information including, but not limited to, speed, acceleration, light, vibration, proximity, location, image and so on. The processor of the UE may receive and process sensor information obtained from the sensor and may perform various types of functions, such as collision avoidance, autonomous driving and so on. Various components (e.g., a camera, a Universal Serial Bus (USB) port, etc.) may be further included in the UE. For example, a camera may be further coupled to the processor of the UE and may be used for various services such as autonomous driving, a vehicle safety service and so on. In some scenarios, some components, e.g., a keypad, a Global Positioning System (GPS) chip, a sensor, a speaker and/or a microphone, may not be implemented in a UE.

Figure 7:
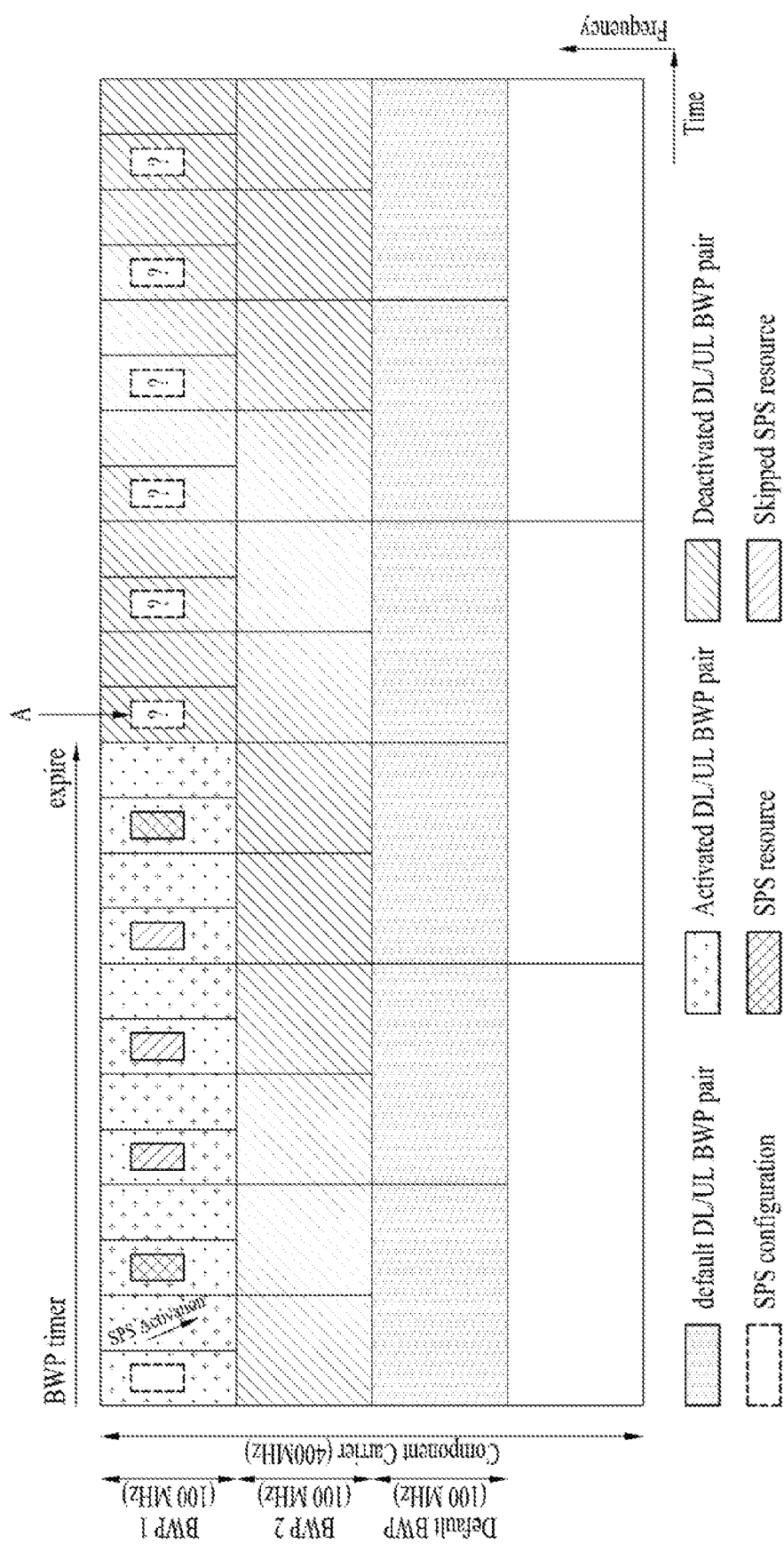
FIG. 7 is an example for Bandwidth Part (BWP) operation in the prior art.

FIG. 7 is an example for Bandwidth Part (BWP) operation in the prior art.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

To enable BA on the PCell, the gNB configures the UE with UL and DL BWP(s). To enable BA on SCells in case of CA, the gNB configures the UE with DL BWP(s) at least (i.e. there may be none in the UL). For the PCell, the initial BWP is the BWP used for initial access. For the SCell(s), the initial BWP is the BWP configured for the UE to first operate at SCell activation.

In paired spectrum, DL and UL can switch BWP independently. In unpaired spectrum, DL and UL switch BWP simultaneously. Switching between configured BWPs happens by means of DCI or inactivity timer. When an inactivity timer is configured for a serving cell, the expiry of the inactivity timer associated to that cell switches the active BWP to a default BWP configured by the network.

To enable reasonable UE battery consumption when BA is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, PRACH and UL-SCH.

When BA is configured, the UE only has to monitor PDCCH on the one active BWP i.e. it does not have to monitor PDCCH on the entire DL frequency of the cell. A BWP inactivity timer (independent from the DRX inactivity-timer described above) is used to switch the active BWP to the default one: the timer is restarted upon successful PDCCH decoding and the switch to the default BWP takes place when it expires.

Based on the current agreement, the DL/UL BWP can be defined as follows:

Initial active DL/UL BWP: it is valid for a UE until the UE is explicitly (re)configured with bandwidth part(s) during or after RRC connection is established. As the first RRC Connection reconfiguration can be received only after the UE completes the RRC Connection establishment, it could be understood that BWP switching doesn't occur during RA procedure for RRC Connection establishment.

Default DL/UL BWP: For a Pcell, the default DL BWP (or DL/UL BWP pair) can be configured/reconfigured to a UE. If no default DL BWP is configured, the default DL BWP is the initial active DL BWP. For an Scell, the default DL BWP (or DL/UL BWP pair) can be configured to a UE with a timer for timer-based active DL BWP (or DL/UL BWP pair) switching, along with a default DL BWP (or the default DL/UL BWP pair) which is used when the timer is expired. The default DL BWP for a Scell can be different from the first active DL BWP.

Active DL/UL BWP other than the default DL/UL BWP: One or multiple DL BWP(s) and UL BWP(s) (or DL/UL BWP pair(s)) can be semi-statically configured to a UE by signalling. UE expects at least one DL BWP and one UL BWP being active among the set of configured BWPs for a given time instant. A UE is only assumed to receive/transmit within active DL/UL bandwidth part(s) using the associated numerology.

DL/UL BWP pair: For unpaired spectrum, a DL BWP and an UL BWP are jointly configured as a pair, with the restriction that the DL and UL BWPs of such a DL/UL BWP pair share the same centre frequency but may be of different bandwidths in Rel-15 for each UE-specific serving cell for a UE. For paired spectrum, DL and UL BWPs are configured separately and independently in Rel-15 for each UE-specific serving cell for a UE. Up to now, there was no discussion whether the paired DL/UL BWP is configured with cell-common manner or UE-specific manner. Based on the agreement, it seems that a DL BWP and an UL BWP can be jointly configured as a pair in the UE-specific manner for unpaired spectrum.

The activation/deactivation of DL and UL BWPs can be performed by means of dedicated RRC signalling, DCI or timer. Timer-based switching is to support a fallback mechanism to default DL BWP. In this case, a UE starts the timer when switching to a DL BWP other than the default DL BWP and restarts the timer to the initial value when it successfully decodes a DCI to schedule PDSCH(s) in its active DL BWP. And, the UE switches its active DL BWP to the default DL BWP when the BWP inactivity timer expires. If the active DL/UL BWP has been paired, a UE will switch to default DL/UL BWP pair when the switching condition is met.

In wider bandwidth operation, the SPS can be configured to a UE. Based on the current agreement, the BWP can be switched by DL or UL scheduling via DCI or BWP inactivity timer expiry. Based on the current SPS procedure, the UE can periodically use the SPS resource for DL data reception or UL data transmission without explicit DL/UL scheduling grant if Semi-Persistent Scheduling is enabled by RRC. The UE may not use a configured UL SPS resource if the MAC entity is configured to skip the uplink TX SPS resource and the MAC PDU includes only the MAC CE for padding BSR or periodic BSR with zero MAC SDUs. And, the UE may not receive a MAC PDU on the configured DL SPS resource if the network skips the configured DL SPS resource. In this condition, if there is no MAC PDU transmitted or received on the uplink grant or the downlink assignment, the configured DL/UL SPS resources are really not used.

However, according to the current agreement, the UE restarts the BWP inactivity timer to the initial value only when it successfully decodes a DCI to schedule PDSCH(s) in its active DL BWP (or its active DL/UL BWP pair). The UE can transmit or receive a MAC PDU on a configured UL/DL SPS resource without the explicit DL/UL scheduling information via DCI, but the UE does not restart the BWP inactivity timer.

Referring to FIG. 7, when BWP 1, not the default BWP, is activated, the BWP inactivity timer associated with BWP 1 is started. When the SPS resource configuration is activated in BWP1, the UE is configured to transmit or receive data in the configured SPS resources. The problem is from A point. According to the current specification, if the BWP inactivity timer expires, BWP 1 should be switched to the default BWP. However, even though there is DL data to be received using the SPS resource, DL data loss is inevitable because the base station cannot know this when it is switched to the default BWP.

Therefore, the operation of the BWP inactivity timer should be redefined considering the SPS resource and skipping.

Figure 8:
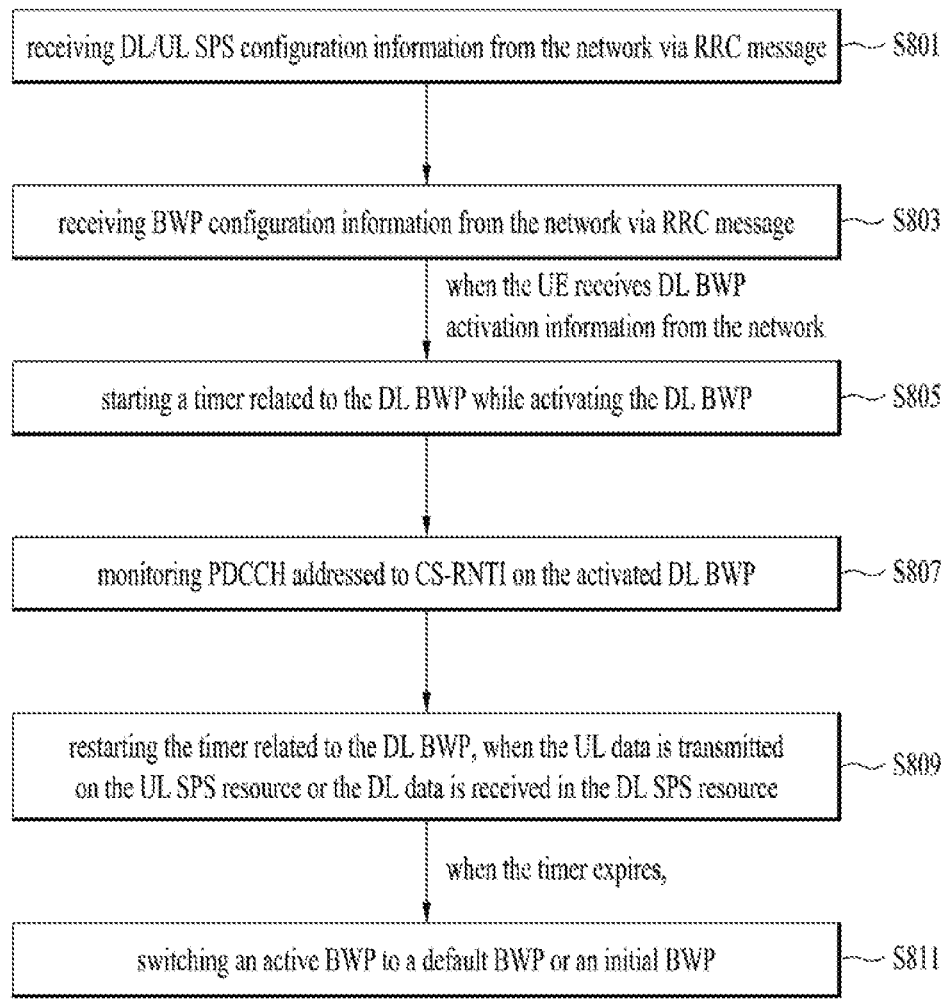
FIG. 8 is a conceptual diagram for handling for BWP operation by a user equipment in wireless communication system according to embodiments of the present invention.

FIG. 8 is a conceptual diagram for handling for BWP operation in wireless communication system according to embodiments of the present invention.

This embodiment describes from a user equipment perspective.

This invention proposes that the BWP operation is to restart a timer related to a DL BWP considering the SPS resource. So, as another condition to restart the timer, we can consider that the UE restarts the timer when there is DL SPS resource, or when there is DL SPS resource and the UE receives a MAC PDU on the DL SPS resource.

Here, the timer can be written by BWP timer or BWP inactivity timer. This timer is related to DL BWP other than a default/initial DL BWP. The timer may be configured per BWP of the cell, and the timer may be started when a BWP is activated. While the timer related to the DL BWP is running, the UE considers that the DL BWP is activated.

The UE receives DL/UL SPS configuration information from the network via RRC message (S801). The DL/UL SPS configuration information includes at least one of DL/UL SPS resource interval, number of DL/UL HARQ processes, etc. The DL/UL SPS configuration information is provided per cell or per BWP.

In the downlink, the network can dynamically allocate resources to UEs via the C-RNTI on PDCCH(s). A UE always monitors the PDCCH(s) in order to find possible assignments when its downlink reception is enabled (activity governed by DRX when configured). When CA is configured, the same C-RNTI applies to all serving cells.

The network may pre-empt an ongoing PDSCH transmission to one UE with a latency-critical transmission to another UE. The network can configure UEs to monitor interrupted transmission indications using INT-RNTI on a PDCCH. If a UE receives the interrupted transmission indication, the UE may assume that no useful information to that UE was carried by the resource elements included in the indication, even if some of those resource elements were already scheduled to this UE.

In addition, with Semi-Persistent Scheduling (SPS), the network can allocate downlink resources for the initial HARQ transmissions to UEs: RRC defines the periodicity of the configured downlink assignments while PDCCH addressed to CS-RNTI can either signal and activate the configured downlink assignment, or deactivate it; i.e. a PDCCH addressed to CS-RNTI indicates that the downlink assignment can be implicitly reused according to the periodicity defined by RRC, until deactivated.

In the uplink, the network can dynamically allocate resources to UEs via the C-RNTI on PDCCH(s). A UE always monitors the PDCCH(s) in order to find possible grants for uplink transmission when its downlink reception is enabled (activity governed by DRX when configured). When CA is configured, the same C-RNTI applies to all serving cells.

In addition, with Configured Grants, the network can allocate uplink resources for the initial HARQ transmissions to UEs. Two types of configured uplink grants are defined:

With Type 1, RRC directly provides the configured uplink grant (including the periodicity). And with Type 2, RRC defines the periodicity of the configured uplink grant while PDCCH addressed to CS-RNTI can either signal and activate the configured uplink grant, or deactivate it; i.e. a PDCCH addressed to CS-RNTI indicates that the uplink grant can be implicitly reused according to the periodicity defined by RRC, until deactivated.

When a configured uplink grant is active, if the UE cannot find its C-RNTI/CS-RNTI on the PDCCH(s), an uplink transmission according to the configured uplink grant can be made. Otherwise, if the UE finds its C-RNTI/CS-RNTI on the PDCCH(s), the PDCCH allocation overrides the configured uplink grant. Retransmissions other than repetitions are explicitly allocated via PDCCH(s).

Here, SPS configuration means the MAC entity receives the DL or UL SPS configuration information from RRC signaling when the RRC entity setups the SPS configuration. The SPS operation is NOT activated in MAC entity. Or the SPS configuration means the MAC entity deactivates SPS operation when a PDCCH indicating SPS deactivation is received. The SPS configuration is NOT released in the RRC entity. In this condition, the MAC entity considers that there is "a DL or UL SPS configuration".

Here, the MAC entity activates a SPS operation when a PDCCH indicating SPS activation is received. For a DL SPS resource, the UE may receive a MAC PDU on a DL SPS resource. For an UL SPS resource, the UE may transmit a MAC PDU on a UL SPS resource. In this condition, MAC considers that there is periodically "a DL or UL SPS resource".

The UE receives BWP configuration information from the network via RRC message (S803). The BWP configuration information includes at least one of DL/UL carrier frequency, DL/UL bandwidth, a BWP inactivity timer, etc. Multiple BWPs can be configured per cell. A BWP inactivity timer is configured per BWP.

For the BWP configuration, one or multiple BWP(s) may be configured to a UE via RRC signaling. A DL BWP and an UL BWP may be jointly configured as a pair for the unpaired spectrum, or a DL BWP and an UL BWP may be configured separately for the paired spectrum. At least one DL BWP and one UL BWP of a cell may be active among the set of configured BWPs for a given time instant.

The UE receives BWP activation information from the network. The BWP activation information indicates which BWP the UE shall activate. When the UE receives BWP activation information from the network, the UE activates the indicated BWP and starts the corresponding timer related to the indicated BWP (S805). While the timer is running, the UE considers that the corresponding BWP is activated, and the UE can transmit/receive a MAC PDU from/to the BWP.

The UE monitors PDCCH addressed to SPS-C-RNTI (or CS-RNTI) on the activated BWP (S807).

When the UE receives PDCCH addressed to SPS-C-RNTI (or CS-RNTI) and if it indicates SPS activation, the UE configures a set of SPS resource using the received SPS configuration information. The set of SPS resource includes one or more of SPS resource spanned periodically in the time domain. Here, DL SPS resources are configured on the DL BWP and UL SPS resources are configured on a UL BWP related with the DL BWP.

The UE restarts the timer at the following time points (S809).

First, the UE restarts the timer at the time point when there is UL SPS resource or there is DL SPS resource. In this case, time point when there is SPS resource may be defined to the time value of the TTI with the SPS resource.

Second, the UE restarts the timer at the time point when there is UL SPS resource and the UE transmits a MAC PDU on the UL SPS resource. In this case, the MAC PDU not containing a MAC SDU may not trigger restart of the timers.

The time point when there is UL SPS resource and the UE transmits a MAC PDU on the UL SPS resource may be defined to the time value of the TTI with the UL MAC PDU, or the start time value of the transmission/encoding of the UL MAC PDU on the SPS PUSCH resource, or the end time value of the transmission/encoding of the UL MAC PDU on the SPS PUSCH resource.

Third, the UE restarts the timer at the time point when there is DL SPS resource and the UE receives a MAC PDU on the DL SPS resource.

The time point when there is DL SPS resource and the UE receives a MAC PDU on the DL SPS resource may be defined to the time value of the TTI with the DL MAC PDU, or the start time value of the reception/decoding of the DL MAC PDU on the SPS PDSCH resource, or the end time value of the reception/decoding of the DL MAC PDU on the SPS PDSCH resource.

The time value of a TTI may be based on the subframe/slot/symbol unit, and this may be different depending on the numerology.

Here, the MAC PDU may contain at least one MAC SDU or MAC CE or MAC header.

Preferably, the timer related to the DL BWP is not re-started when the UL data is not transmitted on the UL SPS resource or the DL data is not received in the DL SPS resource.

When the timer expires, the UE switches an active BWP to a default BWP or an initial BWP (S811). It means that the UE deactivates the corresponding DL BWP, and the UE may activate other BWP (i.e., default BWP or initial BWP) (S811).

The proposed method is implemented by a user equipment (UE), shown in FIG. 6, but it can be any apparatus for performing the same operation.

As shown in FIG. 6, the UE (1100 or 1200) may comprises processor (1111 or 1211), Memory (1112 or 1212) and RF module (transceiver; 1113 or 1213). The processor (1111 or 1211) is electrically connected with the transceiver (1113 or 1213) and controls it.

Specifically, FIG. 6 may represent a UE comprising a processor (1111 or 1211) operably coupled with a memory (1112 or 1212) and configured to start a timer related to a DL BWP, when the UE switches an active BWP for a serving cell to the DL BWP, transmit UL data on one of the UL SPS resources or receive DL data on one of the DL SPS resources via the transceiver (1113 or 1213); and restart the timer related to the DL BWP when the UL data is transmitted on the UL SPS resource or the DL data is received in the DL SPS resource via the transceiver (1113 or 1213).

The proposed method is implemented by may be implemented by a processing chip. In case of a system on chip (SoC), the processing chip may include the processor 1111 or 1211 and the memory 1112 or 1212, and may be mounted on, installed on, or connected to the communication device 1100 or 1200.

The processing chip may be configured to start a timer related to a DL BWP, when the UE switches an active BWP for a serving cell to the DL BWP, transmit UL data on one of the UL SPS resources or receiving DL data on one of the DL SPS resources via the transmitter or a receiver; and restart the timer related to the DL BWP when the UL data is transmitted on the UL SPS resource or the DL data is received in the DL SPS resource.

The memory 1112 or 1212 in the processing chip may be configured to store software codes including instructions that, when executed by the processor, causes the processor to perform some or all of functions, methods or processes discussed in the present disclosure.

The transceiver 1113 or 1213 operably connected or coupled to the processing chip may transmit UL data on one of the UL SPS resources or receive DL data on one of the DL SPS resources under the control of the processor 1111 or 1211 of the processing chip.

Specifically, FIG. 6 may represent a UE comprising a processor (110) operably coupled with a memory and configured to start a timer related to a DL BWP, when the UE switches an active BWP for a serving cell to the DL BWP, transmit UL data on one of the UL SPS resources or receiving DL data on one of the DL SPS resources via the transmitter or a receiver; and restart the timer related to the DL BWP when the UL data is transmitted on the UL SPS resource or the DL data is received in the DL SPS resource via the transmitter or receiver (135).

Figure 9:
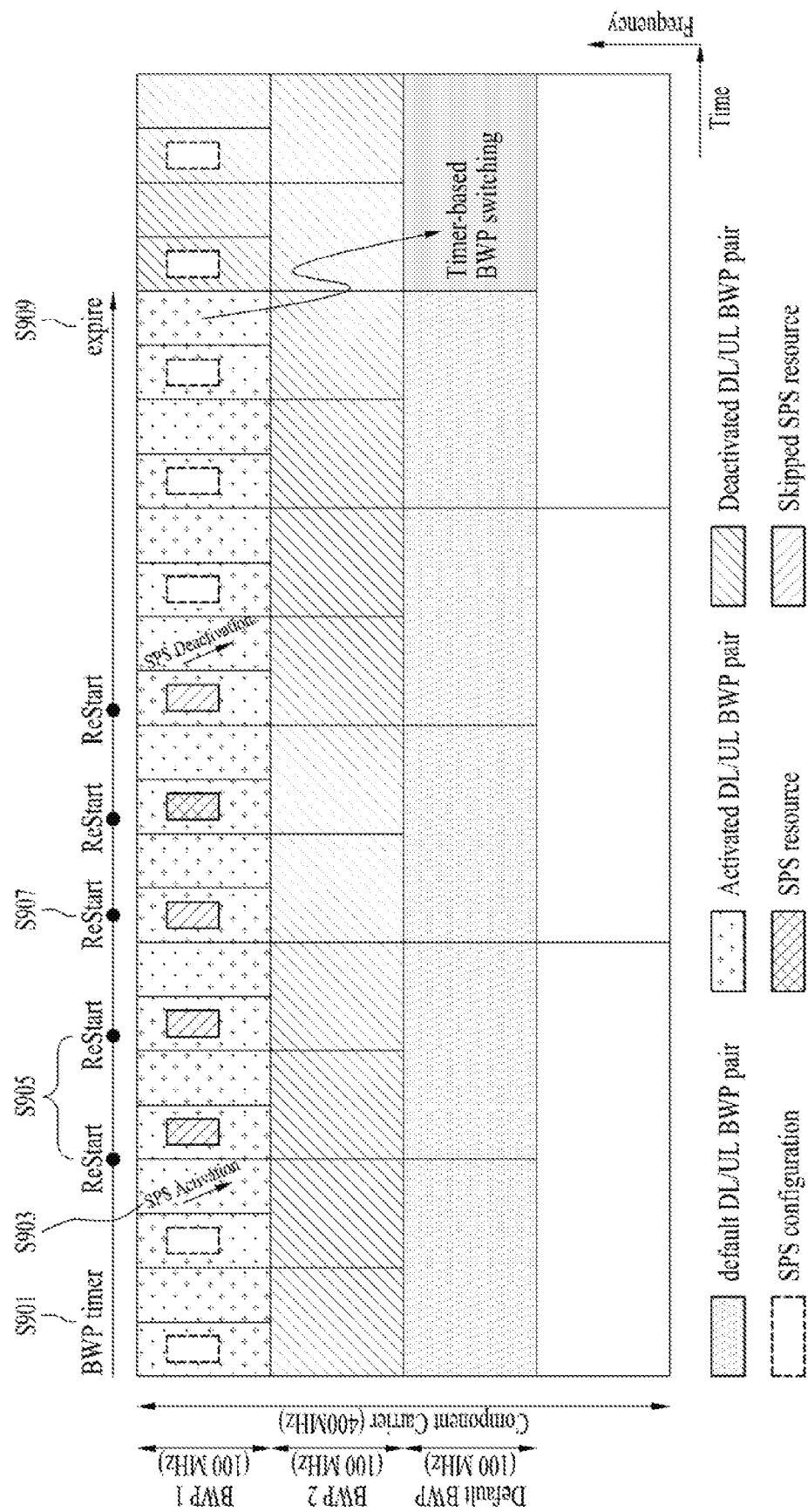
FIGS. 9 and 10 are examples for handling for BWP operation in wireless communication system according to embodiments of the present invention.
Figure 10:
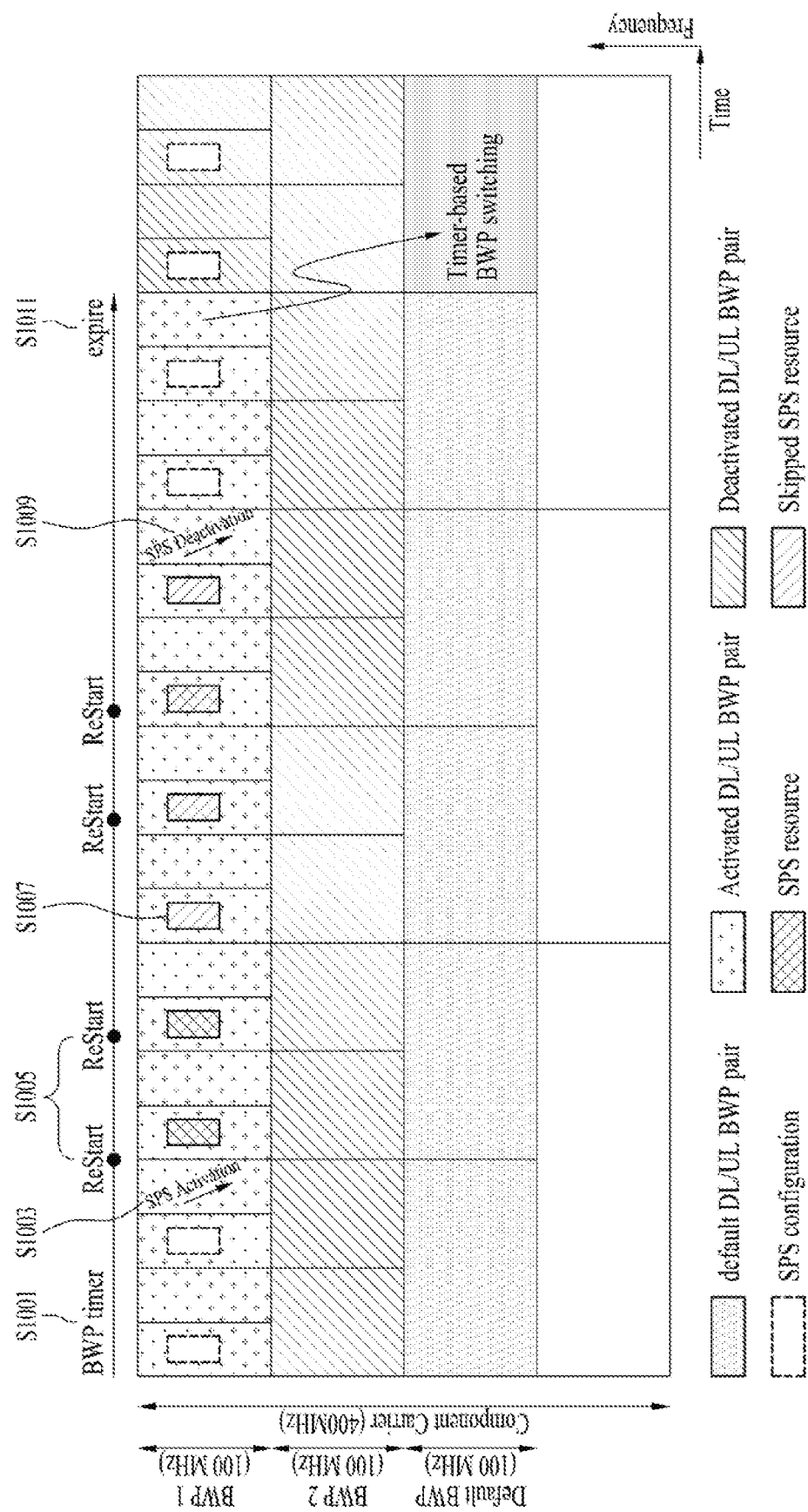

FIGS. 9 and 10 are examples for handling for BWP operation in wireless communication system according to embodiments of the present invention.

The following describes the exemplary behavior of the UE according to embodiments of the present invention. These examples assume the followings that one BWP in the cell is active. In other words, the timer of the active BWP is running. A DL or UL SPS configuration is configured on the active BWP. And the SPS operation is deactivated.

The timer can be a BWP inactivity timer.

The FIG. 9 shows an example of a case where the UE restarts the timer of the BWP at the time point when there is DL/UL SPS resource.

When the UE switches an active BWP to BWP 1, the timer of BWP1 starts (S901).

When the UE receives the SPS activation indication on the BWP1, the UE activates the SPS resource configured on the BWP1 (S903).

If there is DL/UL SPS resource, the UE can transmit or receive a MAC PDU on the configured DL/UL SPS resource.

In this case, the UE restarts the timer of BWP1 at the time point of the TTI with the DL/UL SPS resource regardless of transmitting or receiving data using the DL/UL SPS resource.

That is, the UE can start the timer of the BWP1 at the time point of the TTI receiving or transmitting the MAC PDU on the DL/UL SPS resource (S905). Further, the UE can restart the timer of BWP1 at the time point of the TTI with Skipped DL/UL SPS resource (S907).

For the skipped DL SPS resource, the UE does not receive a MAC PDU on a configured DL SPS resource if the network skips a configured DL SPS resource, and for the skipped UL SPS resource, the UE does not transmit a MAC PDU on a configured UL SPS resource if MAC is configured to skip a configured UL SPS resource with skipUplinkTxSPS and there is no UL data. In this condition, MAC considers that there may be "a skipped DL or UL SPS resource".

When the timer expires, the UE switches an active BWP from the BWP1 to the default BWP (S909).

The FIG. 10 shows an example of a case where the UE restarts the timer of the BWP at the time point when there is DL/UL SPS resource and the UE receives or transmits a MAC PDU on the DL or UL SPS resource.

When the UE switches an active BWP to BWP 1, the timer of BWP1 starts (S1001).

If the UE receives the SPS activation indication on the BWP1, the UE activates the SPS resource configured on the BWP1 (S1003).

The UE checks whether a MAC PDU is received or transmitted on the DL/UL SPS resource of BWP1 or not.

If a MAC PDU is received or transmitted on the DL/UL SPS resource of BWP1, the UE restarts the timer of BWP1 at the time point of the TTI receiving or transmitting the MAC PDU on the DL/UL SPS resource (S1005). If a MAC PDU is not received or transmitted on the DL/UL SPS resource of BWP1, the UE does not restart the timer of BWP1 (S1007).

When the UE receives the SPS deactivation indication on the BWP1, the UE deactivates the SPS resource configured on the BWP1, but the timer is still running (S1009).

When the timer expires, the UE switches an active BWP from the BWP1 to the default BWP (S1011).

Our invention is an addition to the condition for restarting the timer. That is, according to the current specification, the UE restarts the timer to the initial value only when it successfully decodes a DCI to schedule PDSCH(s) in its active DL BWP. That means the UE doesn't restart the timer considering the SPS resource, which is used without DCI, on the active BWP other than the default BWP. So, we can consider that the UE restarts the timer when there is DL SPS resource, or when there is DL SPS resource and the UE receives a MAC PDU on the DL SPS resource. Considering the DL SPS skipping, it seems to be desirable for the UE to restart the timer in the latter case.

Consequently, we propose that a UE restarts the timer when the UE receives a MAC PDU on the DL SPS resource for the active DL BWP.

Figure 11:
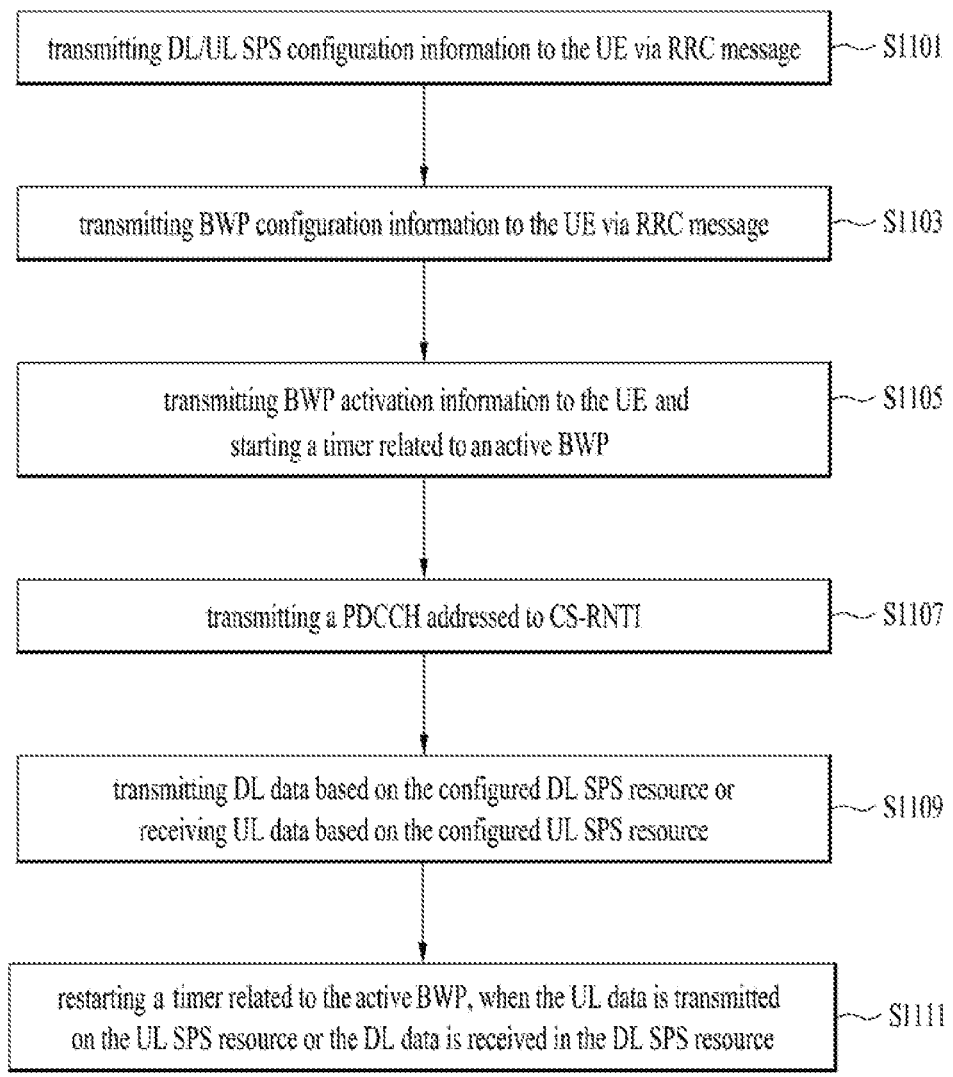
FIG. 11 is a conceptual diagram for handling for BWP operation by a base station in wireless communication system according to embodiments of the present invention.

FIG. 11 is a conceptual diagram for handling for BWP operation in wireless communication system according to embodiments of the present invention.

This embodiment describes from a network apparatus perspective. The network apparatus means eNB or gNB.

The network apparatus transmits DL/UL SPS configuration information to the UE via RRC message (S1101). The DL/UL SPS configuration information includes at least one of DL/UL SPS resource interval, number of DL/UL HARQ processes, etc. The DL/UL SPS configuration information is provided per cell or per BWP.

The network apparatus transmits BWP configuration information to the UE via RRC message (S1003). The BWP configuration information includes at least one of DL/UL carrier frequency, DL/UL bandwidth, a BWP inactivity timer, etc. Multiple BWPs can be configured per cell. A BWP inactivity timer is configured per BWP.

For the BWP configuration, one or multiple BWP(s) may be configured to a UE via RRC signaling. A DL BWP and an UL BWP may be jointly configured as a pair for the unpaired spectrum, or a DL BWP and an UL BWP may be configured separately for the paired spectrum. At least one DL BWP and one UL BWP of a cell may be active among the set of configured BWPs for a given time instant.

The network apparatus transmits BWP activation information to the UE. The BWP activation information indicates which BWP the UE shall activate. When network apparatus transmits BWP activation information to the UE, the UE activates the indicated BWP and the corresponding timer is started (S1105). While the timer is running, the network considers that the corresponding BWP is activated, and the network can transmit/receive a MAC PDU from/to the BWP.

When the network apparatus transmits PDCCH addressed to SPS-C-RNTI (or CS-RNTI) and if it indicates SPS activation, the UE configures a set of SPS resource using the received SPS configuration information (S1107). The set of SPS resource includes one or more of SPS resource spanned periodically in the time domain. Here, DL SPS resources are configured on the DL BWP and UL SPS resources are configured on a UL BWP related with the DL BWP.

The network apparatus transmits DL data based on the configured DL SPS resource to the UE or receives UL data based on the configured UL SPS resource from the UE (S1109).

The network restarts the timer at the time point when there is UL SPS resource, or there is DL SPS resource, or there is UL SPS resource and the network apparatus receives a MAC PDU on the UL SPS resource, or there is DL SPS resource and the network apparatus transmits a MAC PDU on the DL SPS resource (S1111).

The proposed method is implemented by a network apparatus, shown in FIG. 6, but it can be any apparatus for performing the same operation.

As shown in FIG. 6, the network apparatus may comprises a processor (1111 or 1211), Memory (1112 or 1212), and RF module (transceiver; 1113 or 1213). The processor (1113 or 1213) is electrically connected with the transceiver (1113 or 1213) and controls it.

Specifically, FIG. 6 may represent a network apparatus comprising a processor (1111 or 1211) operably coupled with the RF module (transceiver; 1113 or 1213) and configured to transmit DL/UL SPS configuration information to the UE, to transmit BWP configuration information to the UE via RRC message, to transmit BWP activation information to the UE, to transmit the PDCCH addressed to SPS-C-RNTI, to transmit DL data based on the configured DL SPS resource or receive UL data based on the configured UL SPS resource via the transceiver (1113 or 1213), and to restarts the timer at the time point when the network transmit DL data based on the configured DL SPS resource or receive UL data based on the configured UL SPS resource via the transceiver (1113 or 1213).

The aforementioned implementations are achieved by combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the implementations of the present disclosure. The order of operations described in the implementations of the present disclosure may be changed. Some structural elements or features of one implementation may be included in another implementation, or may be replaced with corresponding structural elements or features of another implementation. Moreover, it is apparent that some claims referring to specific claims may be combined with another claims referring to the other claims other than the specific claims to constitute the implementation or add new claims by amendment after the application is filed.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors, etc.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

While the above-described method has been described centering on an example applied to the 3GPP LTE and NR system, the present invention is applicable to a variety of wireless communication systems in addition to the 3GPP LTE and NR system.

What is claimed is:

1. A method for wireless communication, the method comprising:
    starting a timer associated with an active downlink (DL) bandwidth part (BWP), based upon a DL BWP for a serving cell being switched to the active DL BWP;
    wherein the active DL BWP is not a default DL BWP;
    wherein uplink (UL) semi-persistent scheduling (SPS) resources are configured on an UL BWP related to the active DL BWP;
    transmitting UL data on the UL SPS resources, wherein the UL data comprises a medium access control (MAC) protocol data unit (PDU); and restarting the timer associated with the active DL BWP based upon the MAC PDU being transmitted on the UL SPS resources.

2. The method according to claim 1, further comprising:
receiving information related to SPS resource configuration for UL via a radio resource control (RRC) signal from a network; and
configuring the UL SPS resources based on the information related to the SPS resource configuration for UL.

3. The method according to claim 2, wherein the information related to the SPS resource configuration for UL includes at least one of a SPS resource interval for UL or a number of HARQ processes for UL.

4. The method according to claim 1, wherein the active DL BWP is not an initial DL BWP.

5. The method according to claim 1, wherein while the timer associated with the active DL BWP is running, the active DL BWP is considered active.

6. The method according to claim 1, further comprising:
switching the active DL BWP to either the default DL BWP or to an initial DL BWP, based on expiration of the timer associated with the active DL BWP.

7. The method according to claim 1, wherein the timer associated with the active DL BWP is not re-started when the UL data is not transmitted on the UL SPS resources.

8. The method according to claim 1, wherein downlink (DL) SPS resources are configured on the active DL BWP; and wherein the method further comprises:
restarting the timer associated with the active DL BWP based upon a MAC PDU being received on the DL SPS resources.

9. An apparatus for wireless communication, the apparatus comprising:
a memory; and
a processor operably coupled with the memory and configured to:
start a timer associated with an active downlink (DL) bandwidth part (BWP), based upon a DL BWP for a serving cell being switched to the active DL BWP, wherein the active DL BWP is not a default DL BWP,
wherein uplink (UL) semi-persistent scheduling (SPS) resources are configured on an UL BWP related to the active DL BWP,
transmit UL data on the UL SPS resources, wherein the UL data comprises a medium access control (MAC) protocol data unit (PDU), and
restart the timer associated with the active DL BWP based upon the MAC PDU being transmitted on the UL SPS resources.

10. The apparatus according to claim 9, wherein the processor is further configured to:
receive information related to SPS resource configuration for UL via a radio resource control (RRC) signal from a network,
configure the UL SPS resources based on the information related to the SPS resource configuration for UL.

11. The apparatus according to claim 10, wherein the information related to the SPS resource configuration for UL includes at least one of a SPS resource interval for UL or a number of HARQ processes for UL.

12. The apparatus according to claim 9, wherein the active DL BWP is not an initial DL BWP.

13. The apparatus according to claim 9, wherein the processor is further configured to:
consider that the active DL BWP is activated while the timer associated with the active DL BWP is running.

14. The apparatus according to claim 9, wherein the processor is further configured to:
switch the active DL BWP to either the default DL BWP or to an initial DL BWP, based on expiration of the timer associated with the active DL BWP.

15. The apparatus according to claim 9, wherein the timer associated with the active DL BWP is not re-started when the UL data is not transmitted on the UL SPS resources.

16. The apparatus according to claim 9, wherein downlink (DL) SPS resources are configured on the active DL BWP; and wherein the processor is further configured to:
restart the timer associated with the active DL BWP based upon a MAC PDU being received on the DL SPS resources.

* * * * *